United States Patent
Uzun et al.

(10) Patent No.: US 9,363,086 B2
(45) Date of Patent: Jun. 7, 2016

(54) AGGREGATE SIGNING OF DATA IN CONTENT CENTRIC NETWORKING

(71) Applicant: Palo Alto Research Center Incorporated, Palo Alto, CA (US)

(72) Inventors: Ersin Uzun, Campbell, CA (US); Marc E. Mosko, Santa Cruz, CA (US); Michael F. Plass, Mountain View, CA (US); Glenn C. Scott, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 64 days.

(21) Appl. No.: 14/231,515

(22) Filed: Mar. 31, 2014

(65) Prior Publication Data
US 2015/0280918 A1 Oct. 1, 2015

(51) Int. Cl.
| | |
|---|---|
| H04L 29/06 | (2006.01) |
| H04L 9/32 | (2006.01) |
| H04L 9/30 | (2006.01) |
| G06F 15/16 | (2006.01) |

(52) U.S. Cl.
CPC ............... *H04L 9/3247* (2013.01); *H04L 9/30* (2013.01); *H04L 9/3236* (2013.01); *H04L 63/123* (2013.01); *H04L 63/1441* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 817,441 A | 4/1906 | Niesz | |
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,214,702 A * | 5/1993 | Fischer | G06F 21/00 380/30 |
| 5,506,844 A | 4/1996 | Rao | |

(Continued)

FOREIGN PATENT DOCUMENTS

| | | |
|---|---|---|
| EP | 0295727 A2 | 12/1988 |
| EP | 0757065 A2 | 7/1996 |

(Continued)

OTHER PUBLICATIONS

Baugher et al., Self-Verifying Names for Read-Only Named Data, Mar. 2012, IEEE INFOCOM Workshop on Emerging Design Choices in Name-Oriented Networking, pp. 274-279.*

(Continued)

*Primary Examiner* — Abu Sholeman
*Assistant Examiner* — Maung Lwin
(74) *Attorney, Agent, or Firm* — Shun Yao; Park, Vaughan, Fleming & Dowler LLP

(57) ABSTRACT

One embodiment provides a system that facilitates routers in verifying content objects in a cost-effective manner by aggregating content objects into a secure content catalog. During operation, a client computing device receives a secure content catalog, which indicates a set of content objects and their corresponding digests. The catalog is digitally signed with the private key of a producer of the catalog. The client computing device constructs an interest for a content object, where the interest indicates a name for the content object and the corresponding digest for the content object, which is based on the secure content catalog. The name for the request content object is a hierarchically structured variable length identifier (HSVLI) which comprises name components ordered from a most general level to a most specific level.

22 Claims, 9 Drawing Sheets

(56) References Cited

U.S. PATENT DOCUMENTS

| | | |
|---|---|---|
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,748,538 B1* | 6/2004 | Chan et al. ............... 726/26 |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,162,635 B2* | 1/2007 | Bisbee et al. ............. 713/176 |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1* | 4/2010 | Chaudhury ............ G06F 21/10 713/176 |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,272,058 B2* | 9/2012 | Brennan ............... 726/24 |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0205345 A1* | 10/2004 | Ripley et al. ............ 713/176 |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1* | 7/2006 | Kim ................ G06F 21/10 369/275.1 |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |

(56) References Cited

U.S. PATENT DOCUMENTS

| | | |
|---|---|---|
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256138 A1* | 10/2008 | Sim-Tang ........... G06F 11/1435 |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1* | 11/2009 | Stewart et al. ................. 370/389 |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1* | 8/2010 | Jacobson et al. .............. 370/392 |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1* | 11/2010 | Ugawa ............. G11B 20/00086 713/176 |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0028209 A1* | 2/2011 | Nguyen et al. ................... 463/29 |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166806 A1* | 6/2012 | Zhang et al. ................... 713/176 |
| 2012/0170913 A1* | 7/2012 | Isozaki ............... G06F 21/10 386/257 |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |

(56) References Cited

U.S. PATENT DOCUMENTS

| | | |
|---|---|---|
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0054971 A1* | 2/2013 | Yamaguchi ............. H04L 9/083 713/171 |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1* | 5/2013 | Kobayashi ............. G06F 21/10 713/158 |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0325888 A1* | 12/2013 | Oneppo ............ G06F 17/30174 707/758 |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0047513 A1* | 2/2014 | van 't Noordende ... G06F 21/44 726/4 |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Anderson et al., Secure Books: Protecting the Distribution of Knowledge, Apr. 1997, Security protocols: proceedings of the 5th international workshop, vol. 1361, pp. 1-12.*

CCNx Signature Generation and Verification, Jul. 23, 2013, https://www.ccnx.org/releases/latest/doc/technical/SignatureGeneration.html, 6 pages.*

Gasti, Paolo et al., "DoS & DDoS in Named Data Networking", 2013 22nd International Conference on Computer Communications and Networks (ICCCN), Aug. 2013, pp. 1-7.

Baugher, Mark et al., "Self-Verifying Names for Read-Only Named Data", 2012 IEEE Conference on Computer Communications Workshops (INFOCOM WKSHPS), Mar. 2012, pp. 274-279.

Zhang, et al., "Named Data Networking (NDN) Project", http://www.parc.com/publication/2709/named-data-networking-ndn-project.html, Oct. 2010, NDN-0001, PARC Tech Report.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc.downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit . . . , Jun. 2004.

(56) References Cited

OTHER PUBLICATIONS

J. Shao and Z. Cao. CCA—Secure Proxy Re-Encryption without Pairings. Public Key Cryptography. Springer Lecture Notes in Computer Science vol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube: An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/.downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

(56) References Cited

OTHER PUBLICATIONS

Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/agkarl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/, (retrieved on Feb. 2, 2016).
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S.Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.

(56) References Cited

OTHER PUBLICATIONS

Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12,2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

─ 500

| INDEX 134 | CONTENT OBJ NAME 130 | DIGEST 132 |
|---|---|---|
| INDEX 134.1 | NAME 130.1 | DIGEST 132.1 |
| INDEX 134.2 | NAME 130.2 | DIGEST 132.2 |
| ... | ... | ... |
| ... | ... | ... |
| .... | ... | ... |
| INDEX 134.n | NAME 130.n | DIGEST 132.n |

| INDEX 134 | CONTENT OBJ NAME 130 | DIGEST 132 |
|---|---|---|
| 1 | /netflix/home/frozen/v1/s1 | hash{$CO_{name\ 130.1}$} |
| 2 | /netflix/home/frozen/v1/s2 | hash{$CO_{name\ 130.2}$} |
| ... | ... | ... |
| ... | ... | ... |
| ... | ... | ... |
| n | NAME 130.n | DIGEST 132.n |

| INDEX 134 | SELF-CERTIFYING NAME 128 |
|---|---|
| INDEX 134.1 | SCN 128.1 = NAME 130.1/DIGEST 132.1 |
| INDEX 134.2 | SCN 128.2 = NAME 130.2/DIGEST 132.2 |
| ... | .../... |
| ... | .../... |
| .... | .../... |
| INDEX 134.n | SCN 128.n = NAME 130.n/DIGEST 132.n |

| INDEX 134 | SELF-CERTIFYING NAME (SCN) 128 |
|---|---|
| 1 | /netflix/home/frozen/v1/s1/hash{$CO_{name\ 130.1}$} |
| 2 | /netflix/home/frozen/v1/s2/hash{$CO_{name\ 130.2}$} |
| ... | ... |
| ... | ... |
| ... | ... |
| n | SCN 128.n = NAME 130.n/DIGEST 132.n |

FIG. 5D

AGGREGATE SIGNING OF DATA IN CONTENT CENTRIC NETWORKING

BACKGROUND

1. Field

This disclosure is generally related to the secure and efficient distribution of digital content. More specifically, this disclosure is related to creating secure content catalogs of aggregate content objects to efficiently sign and verify content.

2. Related Art

The proliferation of mobile computing and cellular networks is making digital content more mobile than ever, including content such as song, videos, and movies. Content-centric network (CCN) architectures such as Named Data Networking (NDN) have been designed to facilitate accessing such digital content. A fundamental feature of NDN is to name content, instead of communication end points. Each piece of content is individually named and each piece of data is bound to a unique name that distinguishes the data from any other piece of data. In an NDN, each piece of content is cryptographically signed by its producer or publisher. A requesting consumer verifies the content signature of received content to ensure integrity, origin authentication, and correctness.

In-network content caching by routers is another key feature of NDN. While an NDN router may verify content by verifying the signature, NDN does not require that a router verify all received content. The computational overhead required for a router to perform a cryptographic verification on every packet that it receives is not feasible. Furthermore, a router may not be aware of the specific trust model for each content-producing application, which would require obtaining multiple key certificates or similar structures to establish trust with a public key that verifies a content signature. For these reasons, an NDN router is not required to verify a content signature. However, this leaves the system vulnerable to "poisonous" content if a router does not verify received content before forwarding it on. Furthermore, the need for a content publisher to produce a signature for all content that it publishes carries a high computational cost.

Thus, the computational complexity of both requiring a router to verify the signature on all content that it receives and requiring the publisher to produce a signature on all content that it publishes is at odds with the security need to prevent poisonous content from being disseminated in the network.

SUMMARY

One embodiment provides a system that facilitates routers in verifying content objects in a cost-effective manner by aggregating content objects into a secure content catalog. During operation, a client computing device receives a secure content catalog, which indicates a set of content objects and their corresponding digests. The catalog is digitally signed with the private key of a producer of the catalog. The client computing device constructs an interest for a content object, where the interest indicates a name for the content object and the corresponding digest for the content object, which is based on the secure content catalog. The name for the requested content object is a hierarchically structured variable length identifier (HSVLI) which comprises name components ordered from a most general level to a most specific level.

In some embodiments, the client computing device verifies the signature based on a public key of the producer of the catalog.

In some embodiments, the client computing device receives the requested content object and verifies the received content object by comparing a hash of the received content object with the corresponding digest for the content object in the previously constructed interest, thereby facilitating routers to verify content in a cost-effective manner.

In another embodiment, a last name component of the HSVLI of the content object indicates the digest of the constructed interest.

In some embodiments, prior to receiving the secure content catalog, the client computing device receives a content object that identifies the secure content catalog based on a name of the secure content catalog, where the content object further indicates an index number that corresponds to a content object represented in the secure content catalog.

In some embodiments, the constructed interest corresponds to the secure catalog indicated by the name. The client computing device verifies the signature of the secure content catalog based on a public key of the producer of the catalog and verifies the previously received content object by comparing a hash of the received content object with the digest listed in the secure catalog at the entry corresponding to the index number, where the digest is a cryptographic hash of the content object. This facilitates the cost-effective verification of content by routers in a network.

In some embodiments, a content producing device creates a secure content catalog that indicates a set of content objects and their corresponding digests. The content producing device produces a digital signature for the secure content catalog based on a private key of the producer of the catalog, and then transmits the digitally signed secure content catalog to a client computing device. This facilitates the cost-effective verification of content by routers in the network.

In another embodiment, the content producing device receives an interest for the secure content catalog, where a name for the content objects associated with the secure content catalog is a hierarchically structured variable length identifier (HSVLI) which comprises contiguous name components ordered from a most general level to a most specific level. In response to the interest for the catalog, the content producing device transmits a content object containing the secure content catalog.

In some embodiments, a last name component of the HSVLI of the content object associated with the secure content catalog created by the content producing device indicates the digest of the content object.

In another embodiment, a respective digest for a content object associated with the secure content catalog created by the content producing device is a cryptographic hash of the content object.

In some embodiments, prior to creating the secure content catalog, the content producing device transmits a content object that identifies the secure content catalog based on a name of the secure content catalog, where the content object further indicates an index number that corresponds to a content object represented in the secure content catalog.

BRIEF DESCRIPTION OF THE FIGURES

FIG. 5A presents a table depicting a format of a secure content catalog which indicates a digest of a corresponding content object, in accordance with an embodiment of the present invention.

FIG. 5B presents an exemplary secure content catalog with contents structured to indicate a digest of a corresponding content object, in accordance with an embodiment of the present invention.

FIG. 5C presents a table depicting a format of a secure content catalog, where the digest is contained in a last name component of the HSVLI, in accordance with an embodiment of the present invention.

FIG. 5D presents an exemplary secure content catalog with contents structured where the digest is contained in a last name component of the HSVLI, in accordance with an embodiment of the present invention.

In the figures, like reference numerals refer to the same figure elements.

DETAILED DESCRIPTION

Figure 1:
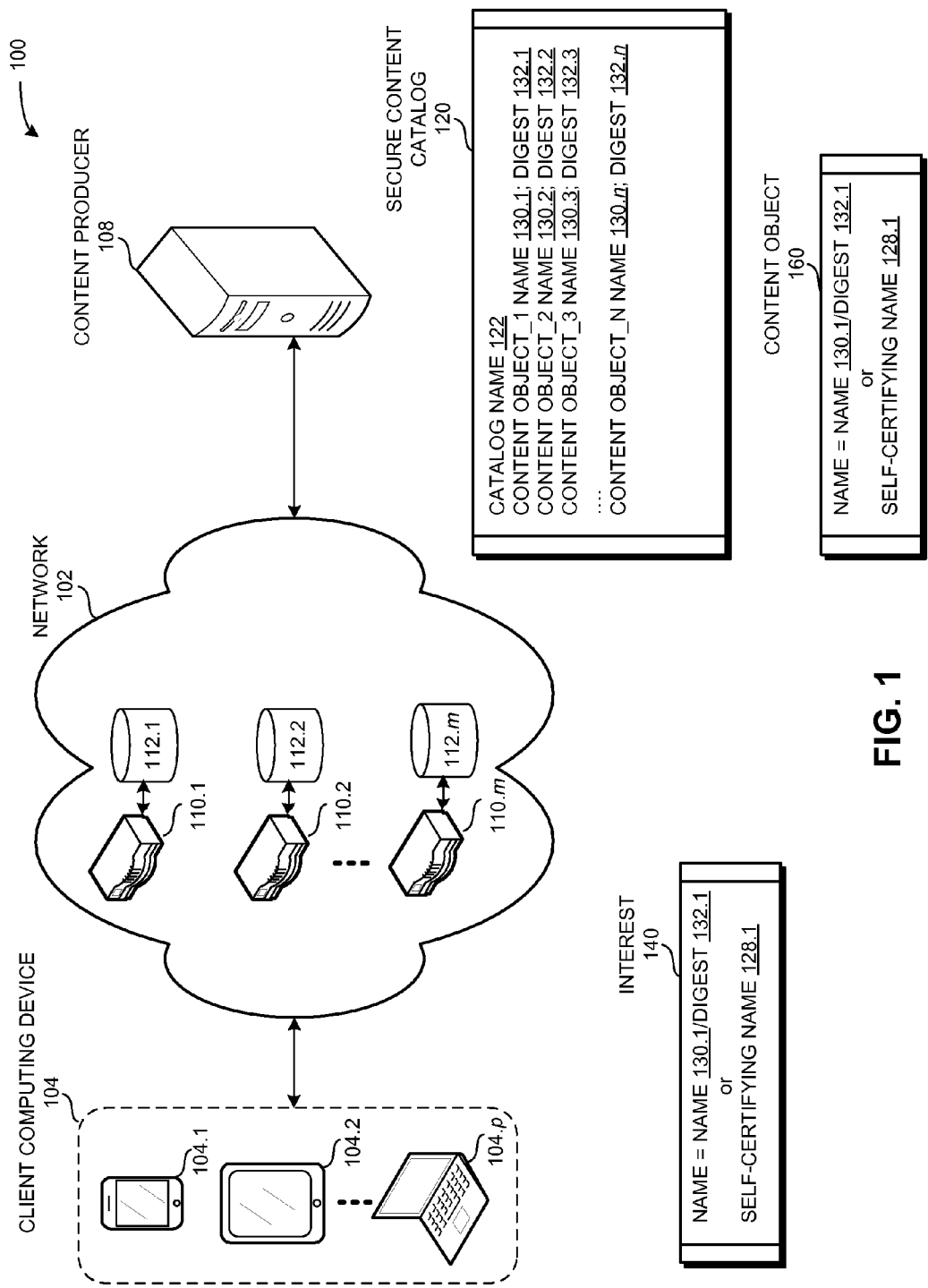
FIG. 1 illustrates an exemplary computer system that facilitates efficient and secure distribution of digital content in a network by signing and verifying aggregates of content objects, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a computer network environment for the secure and efficient distribution of digital content by signing and verifying aggregates of content objects through the use of a secure content catalog. The secure content catalog can comprise a list of content objects identified by their name and their corresponding digest. During operation, a client computing device requests and receives the secure content catalog. The catalog is digitally signed with a private key of a producer of the catalog, such that all content objects associated with the catalog are aggregated. Verification of the signature of the catalog based on a public key of the producer relieves any further need to verify the signatures of the specific content objects associated with the catalog. In this manner, the content publisher need only produce a signature for the catalog once, and the consumer need only verify the signature on the catalog once. Subsequent requests for specific content objects associated with the signed and verified catalog obviate both the need for the content publisher to sign the specific content object and the need for the consumer to verify a signature on the specific content object.

The secure content catalog can contain a list of self-certifying names for its associated content objects, such that a last name component of the name of the content object indicates the digest corresponding to the content object, where the digest is a cryptographic hash of the content object. The name for the content object is a hierarchically structured variable length identifier (HSVLI) which comprises contiguous name components ordered from a most general to a most specific level. By using the self-certifying name as part of the secure content catalog, any entity that requests or receives the packet with the self-certifying name can simply perform a hash operation on the requested content object and then compare that result with the digest corresponding to the requested specific content object. Thus, a router or other forwarding entity in an NDN does not need to verify a signature on every content object that it receives. Because the name of the requested content object contains a digest component, a router need only perform one hash operation (whose computational complexity is much lower than that required to produce a digital signature) on the received content object to determine whether the content object fulfills a requested interest. If the content object is the requested one, the router can forward the content object. If not, the router can discard the interest, thereby preventing the dissemination of poisonous content in the network.

In this manner, content is securely and efficiently distributed through the CCN, whereby: a content publisher need only sign a secure content catalog once; a consumer need only verify a signature on a secure content catalog once; and a consumer and any routers in the CCN need only perform a hash operation, rather than a full signature verification, on a specific content object associated with the catalog.

In some embodiments, an NDN contains three types of entities: a consumer or client device that issues an interest for content; a content producer or publisher that produces, publishes, and signs content; and a router (or other forwarding device) that routes interest packets and forwards corresponding content packets. Each entity maintains the following three components: a Content Store (CS) or cache that is used for content caching and retrieval; a Forwarding Interest Base (FIB) that is a routing table of name prefixes and corresponding outgoing interfaces used to route interests, where forwarding is done via longest-prefix match on name; and a Pending Interest Table (PIT) that is a table of outstanding or pending interests and a set of corresponding incoming and outgoing interfaces.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates an exemplary computing environment 100 that facilitates efficient and secure distribution of digital content in a network by signing and verifying aggregates of content objects, in accordance with an embodiment of the present invention. Computing environment 100 can include a client computing device 104, which can include any computing device that can determine a request for content via a network 102. For example, client device 104 can include a smartphone 104.1, a tablet computer 104.2, and/or a personal computing device 104.p (e.g., a laptop). Computing environment 100 can also include network 102 which can be, for example, a content-centric network (CCN), a named data network (NDN), or an information-centric network (ICN). Network 102 can include forwarding devices such as routers 110.1-110.m, which can each contain storage means 112.1-112.m, respectively, to cache various content passed through network 102. As described above, storage means 112.1-112.m can each contain a Content Store (CS) or cache, a Forwarding Interest Base (FIB), and a Pending Interest Table (PIT).

Computing environment 100 can include a content producer 108 that can host content requested by client computing device 104. Content producer 108 can create a secure content catalog 120 associated with a set of content objects identified by the names 130.1-130.n of the content objects and their corresponding digests 132.1-132.n. Content producer 108 can digitally sign secure content catalog 120 using a private key of content producer 108. Content producer 108 can also transmit the secure content catalog 120 to the client computing device 104 via the routers 110.1-110.n in network 102.

Upon receiving secure content catalog 120, client computing device 104 can verify the signature of secure content catalog 120 based on the public key of content producer 108. Client computing device 104 can construct an interest 140 in a content object associated with secure content catalog 120, by identifying the content object by its name 130.1 and corresponding digest 132.1. This identification could be based on a self-certifying name 128.1, where the name for the content object is a hierarchically structured variable length identifier (HSVLI) which comprises contiguous name components ordered from a most general to a most specific level. The last name component of the name of the content object can indicate the digest 132.1 corresponding to the content object identified by name 130.1, where the digest is a cryptographic hash of the content object.

Upon receiving interest 140 for the content object identified by name 130.1 associated with secure catalog 120, router 110.1 in the network can cache the digest 132.1 (or the entire self-certifying name 128.1) in its Pending Interest Table (PIT) before forwarding interest 140 on to another router 110.n or content producer 108. Content producer 108 receives interest 140 for the content object identified by name 130.1 associated with secure content catalog 120, and transmits a requested content object 160. Content object 160 is identified based on its name 130.1 and corresponding digest 132.1. Upon receiving content object 160 back from content producer 108, router 110.1 performs a hash operation on content object 160 and compares the result of the hash operation to its PIT entry in storage 112.1 corresponding to interest 140. If it does not match, then router 110.1 will discard the packet. If it does match, then router 110.1 will forward the packet on to either the next router 110.n or to client computing device 104, depending on the information in the FIB of the router. Thus, router 110.1 need only perform a hash operation, as opposed to a more computationally complex signature verification, on content object 160. Furthermore, client computing device 104 need only perform the same single hash operation to verify the content. In this manner, the system facilitates the secure and efficient distribution of digital content in a CCN by using the signed and aggregated content objects of the secure content catalog.

Figure 2:
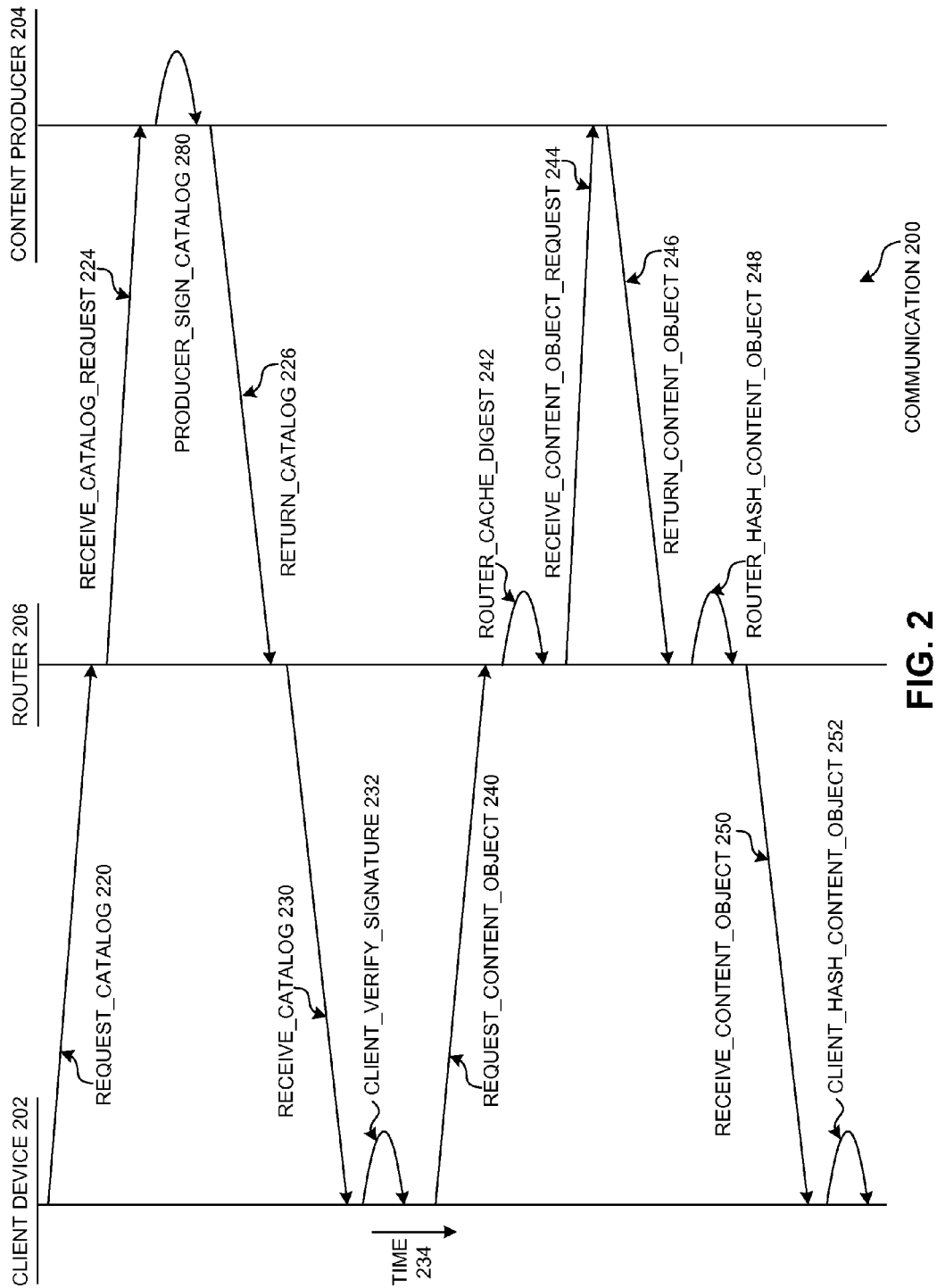
FIG. 2 illustrates exemplary communication between a client device and a content producer using secure content catalogs, in accordance with an embodiment of the present invention.

FIG. 2 illustrates exemplary communication 200 between a client device and a content producer using secure content catalogs, in accordance with an embodiment of the present invention. The vertical lines beneath a client device 202, a router 206, and a content producer 204 indicate time, as shown by a time 234 label depicting time with a downward arrow. During operation, client device 202 sends a request_catalog interest 220 based on the name of the requested catalog. Request_catalog interest 220 passes through router 206, and content producer 204 receives this receive_catalog_request message 224. Content producer 204 creates (or accesses, if already created) a secure content catalog 120 which indicates an aggregation of content objects, each of which is identified based on by a name 130.1 and corresponding digest 132.1, as shown in FIG. 1. This identification could be based on a self-certifying name 128.1, where the name for the content object is a hierarchically structured variable length identifier (HSVLI) which comprises contiguous name components ordered from a most general to a most specific level. The last name component of the name of the content object can indicate the digest 132.1 corresponding to the content object identified by name 130.1, where the digest is a cryptographic hash of the content object. In a producer_sign_catalog procedure 280, content producer 204 produces a digital signature for secure content catalog 120 based on a private key of content producer 204. Content producer 204 then sends a return_catalog message 226 back to client device 202, where return_catalog message 226 comprises secure content catalog 120 and also passes through router 206. Client device 202 then performs a client_verify_signature procedure 232 on the received secure content catalog 120 to verify the secure content catalog.

Client device 202, now in possession of secure content catalog 120 from receive_catalog message 230, generates a request_content_object interest 240, which comprises interest 140, wherein the name 130.1 of the requested content object in interest 140 indicates the corresponding digest 132.1 of the requested content object. The name can be a self-certifying name, e.g., self-certifying name 128.1, that contains the name 130.1 and corresponding digest 132.1, as obtained from secure content catalog 120 and as described in relation to FIG. 1. Router 206 performs a router_cache_digest procedure 242, whereby router 206 caches digest 132.1 (or the self-certifying name 128.1 which contains the name 130.1 and the digest 132.1 as a last name component). Content producer 204 receives a receive_content_object_request message 244, and sends back a content object 160 with the requested name 130.1 (or self-certifying name 128.1). Router 206 receives content object 160 in a return_content_object message 246 from content producer 204. Router 206 performs a router_hash_content_object operation 248 on content object 160. Router 204 then compares the result of this hash operation to the digest that was cached by the previous router_cache_digest operation 242. If the results do not match, then router 206 discards content object 160. If the results do match, then router 206 forwards content object 160 on to client device 202.

Client device 202 thus receives content object 260 in a receive_content_object message 250. Similar to router_hash_content_object operation 242, client device 202 performs a client_hash_content_object operation 252 on content object 160 and compares the result of this hash operation to the digest, based on secure content catalog 120, included in the original interest 140. If there is no match, then the content object is discarded. If there is a match, then the original interest 140 issued by client device 202 is satisfied.

Role of Client Device and Router

Figure 3A:
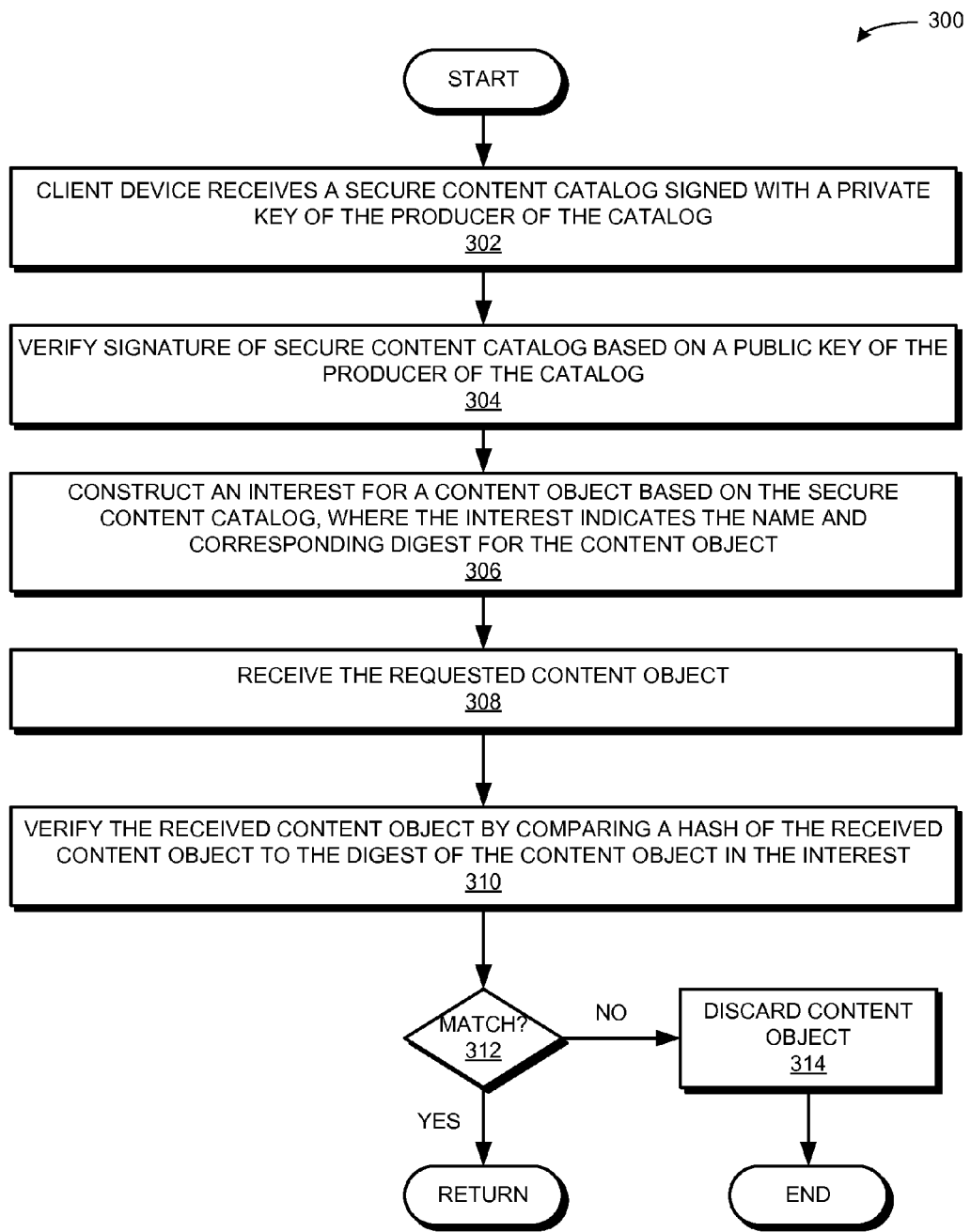
FIG. 3A presents a flow chart illustrating a method for obtaining, by a client computing device, a content object using a secure content catalog, in accordance with an embodiment of the present invention.

FIG. 3A presents a flow chart 300 illustrating a method for obtaining, by a client computing device, a content object using a secure content catalog, in accordance with an embodiment of the present invention. Based on a request for a secure content catalog as described in relation to FIG. 2, a client device receives a secure content catalog which is digitally signed with a private key of the producer of the catalog (operation 302). The secure content catalog indicates a set of content objects and their corresponding digests. The client device verifies the signature of the secure content catalog based on a public key of the producer of the catalog (operation 304). The client device then constructs an interest for a content object based on the secure content catalog, where the constructed interest indicates the name and corresponding digest for the content object (operation 306). Upon receiving the requested content object (operation 308), the client device verifies the received content object by comparing a hash of the received content object with the digest of the content object in the previously constructed interest (operation 310). If there is not a match (decision 312), then the system discards the content object (operation 314). If there is a match (decision 312), then the interest is correctly fulfilled by the received content object, such that the client device now possesses the content object that it originally requested.

Figure 3B:
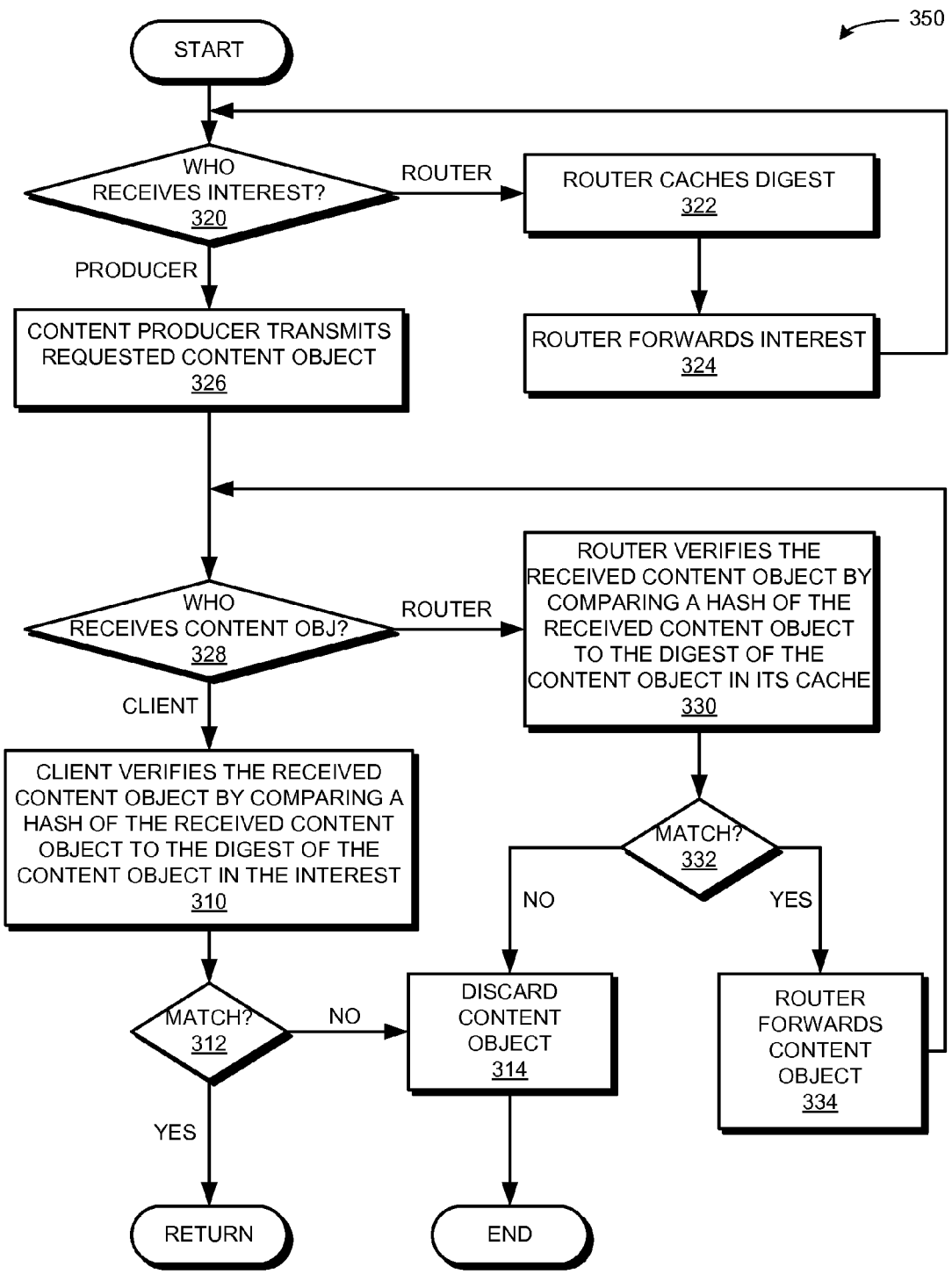
FIG. 3B presents a flow chart illustrating a method for obtaining, by a client computing device and a router, a content object using a secure content catalog, in accordance with an embodiment of the present invention.

FIG. 3B presents a flow chart 350 illustrating a method for obtaining, by a client computing device and a router, a content object using a secure content catalog, in accordance with an embodiment of the present invention. Assume that the first three operations in FIG. 3A have already occurred. In other words, a client device has received the digitally signed secure content catalog (operation 302), verified the digital signature (operation 304), and constructed an interest for a specific content object (operation 306). Depending on which node in the network receives the constructed interest (decision 320), the system proceeds accordingly. If the receiving node is a router, then the router will cache the digest carried in the interest (operation 322) in the Pending Interest Table (PIT) of the router. The digest is associated with the named content object and is a cryptographic hash of the specified content object. The router will then forward the interest according to the information in its Forwarding Information Base (FIB), returning to decision 320. If the receiving node is a content producer, then the content producer will transmit the requested content object (operation 326).

Depending on which node in the network receives the transmitted content object, the system proceeds accordingly. If the receiving node is a router, then the router verifies the received content object by comparing a hash of the received content object with the digest of the content object as contained in the PIT entry of the router from operation 322 (operation 330). If there is not a match (decision 332), then the system discards the content object (operation 314). If there is a match (decision 332), then the router will forward the content object according to the information in its FIB, returning to decision 328 (operation 334). If the receiving node of the content object is a client device, then the client device verifies the received content object by comparing a hash of the received content object with the digest of the content object in the previously constructed interest (operation 310). If there is not a match (decision 312), then the system discards the content object (operation 314). If there is a match (decision 312), then the interest is correctly fulfilled by the received content object, such that the client device now possesses the content object as initially requested.

Thus, both the router and the client device need only perform one computationally inexpensive hash operation on the content object in order to verify the content (operations 310 and 330). For a given set of content objects associated with a specific secure content catalog, a content producer need only perform the computationally expensive signature production once for the secure content catalog (producer_sign_catalog operation 280 described in relation to FIG. 2), and a client device or router (or other forwarding device or node) each need only perform the complex signature verification process once for the secure content catalog (client_verify_signature operation 232 described in relation to FIG. 2). In this manner, subsequent packets sent or received based on the content objects associated with the secure content catalog do not require either a signature production by the content producer or a signature verification by the consumer or router. Subsequent packets require only a simple hash operation by the consumer or router (client_hash_content_object operation 252 and router_hash_content_object operation 248, respectively, described in relation to FIG. 2), thus facilitating the efficient and secure distribution of content in a CCN.

Figure 3C:
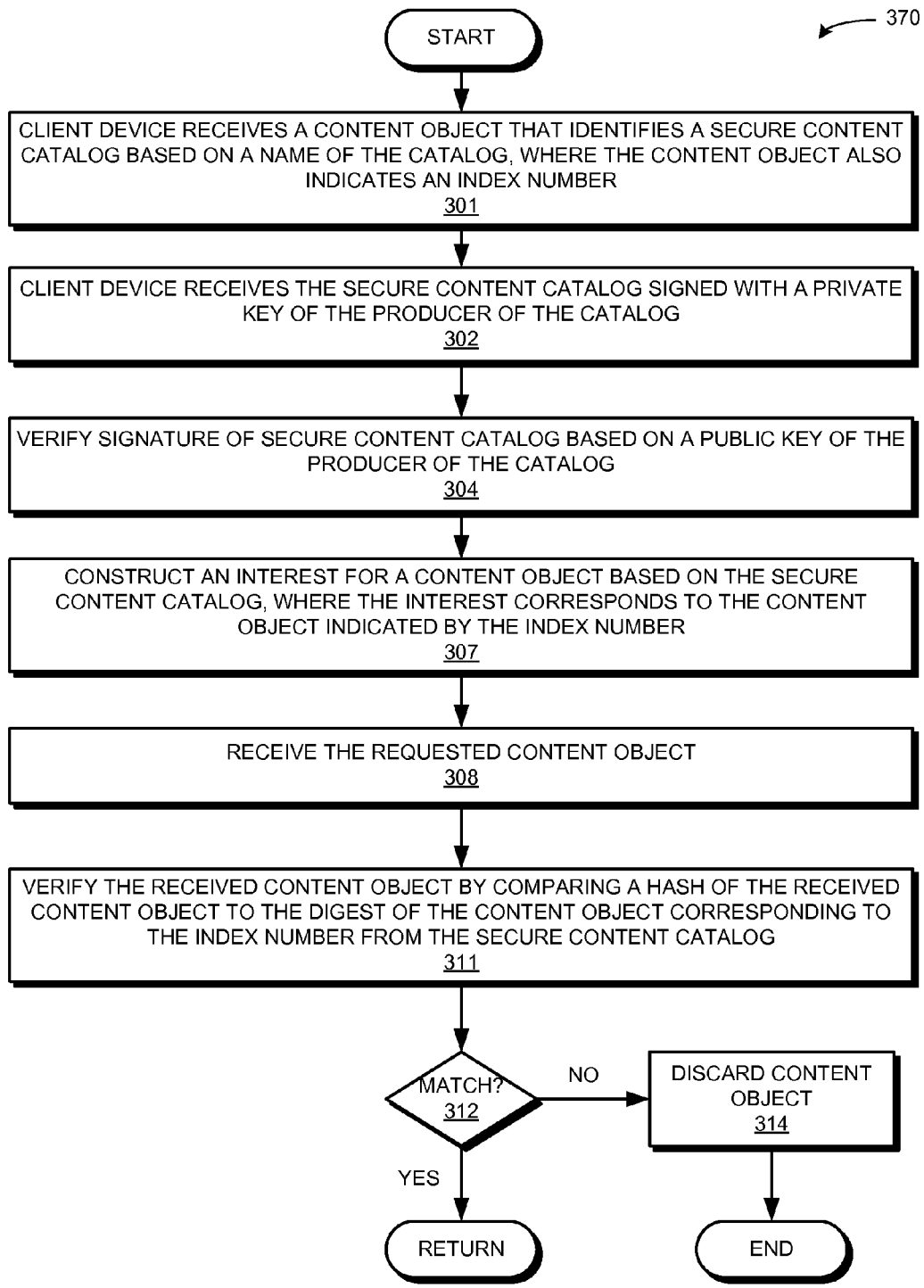
FIG. 3C presents a flow chart illustrating a method for obtaining, by a client computing device, a content object using a secure content catalog, where the client device first receives a content object that identifies the secure content catalog, in accordance with an embodiment of the present invention.

FIG. 3C presents a flow chart 370 illustrating a method for obtaining, by a client computing device, a content object using a secure content catalog, where the client device first receives a content object that identifies the secure content catalog, in accordance with an embodiment of the present invention. A client device receives a content object that identifies the secure content catalog (operation 301). A KeyLocator field of the content object points to the secure content catalog, identifying the secure content catalog by its name. The content object also indicates an index number, which corresponds to a content object represented in the secure content catalog. The client computing device then constructs an interest for the secure catalog based on the name provided in the content object (operation 302), and subsequently receives the secure content catalog which is digitally signed with a private key of the producer of the catalog (operation 302). The secure content catalog indicates a set of content objects and their corresponding digests. In some embodiments, the secure content catalog further includes an index number corresponding to each member content object. The client device verifies the signature of the secure content catalog based on a public key of the producer of the catalog (operation 304). The client device further verifies the received content object by comparing a hash of the received content object with the digest of the content object corresponding to the index number from the secure content catalog (operation 311). If there is not a match (decision 312), then the system discards the content object (operation 314). If there is a match (decision 312), then the interest is correctly fulfilled by the received content object, such that the client device now possesses the content object that it originally requested.

Role of Content Producer

Figure 4:
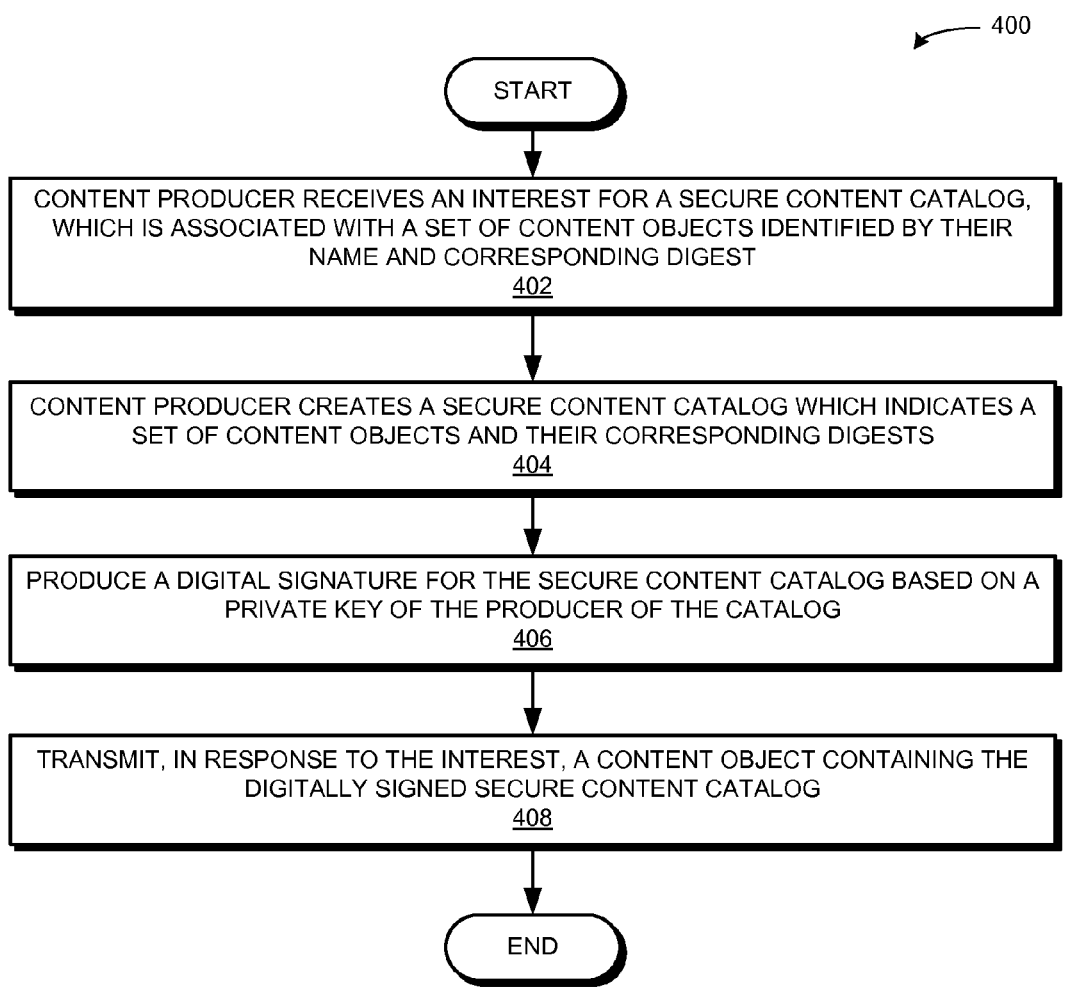
FIG. 4 presents a flow chart illustrating a method for creating, signing, and transmitting, by a content producing device, a secure content catalog, in accordance with an embodiment of the present invention.

FIG. 4 presents a flow chart 400 illustrating a method for creating, signing, and transmitting, by a content producing device, a secure content catalog, in accordance with an embodiment of the present invention. A content producer receives an interest for a secure content catalog, which is associated with a set of content objects identified by their name and their corresponding digest (operation 402). The content producer creates a secure content catalog which indicates a set of content objects and their corresponding digest (operation 404). The content producer then produces a digital signature for the secure content catalog based on a private key of the content producer (operation 406). Subsequently, the content producer transmits, in response to the initial interest, a content object containing the digitally signed secure content catalog (operation 408).

Structure of Secure Content Catalog

Secure content catalog 120 is also known as an Aggregate Signature Object (ASO). An ASO is a special purpose content object and comprises a data structure which can be authenticated using the traditional procedure of signing an individual content object within a CCN, as described in relation to FIG. 2. The data structure of an ASO can comprises a list of digests, where each digest corresponds to a name of a content object associated with the ASO. The digest is a hash of the content object identified by the corresponding name.

FIG. 5A presents a table depicting a format of a secure content catalog 500 which indicates a digest of a corresponding content object, in accordance with an embodiment of the present invention. Secure content catalog 500 can contain an index field 134, a content object name field 130, and a digest field 132, wherein the content objects associated with the secure content catalog are identified by an index 134.1-134.$n$, a name of the content object 130.1-130.$n$, and a corresponding digest 132.1-132.$n$ for the named content object, wherein the digest is a hash of the named content object. FIG. 5B depicts exemplary contents of a secure content catalog 520 that indicates a digest of a corresponding content object, with the data structure described in FIG. 5A. The content object indicated by index 134.1 has an index value of 1 (index 134.1), a name of "/netflix/home/frozen/v1/s1" (name 130.1) and a digest whose value is equal to the hash of the content object identified by name 130.1, "hash$\{CO_{name\ 130.1}\}$" (digest 132.1).

FIG. 5C presents a table depicting a format of a secure content catalog 540, where the digest is contained in a last name component of the HSVLI, in accordance with an embodiment of the present invention. Similar to the data structure of secure content catalog 500, secure content catalog 540 contains an index field 134. Secure content catalog 540 also contains a self-certifying name field 128, where the digest corresponding to the named content object is contained in the last name component of the HSVLI. A self-certifying name 128.1 is structured such that a digest 132.1 is the last name component of the name: "NAME 130.1/DIGEST 132.1." An example of this self-certifying name is shown in FIG. 5D, which depicts the content of a secure content catalog 560 where the digest is contained in the last name component of the HSVLI. The content object indicated by index 134.1 has an index value of 1 and a corresponding self-certifying name 128.1 of "/netflix/home/frozen/v1/s1/hash/$\{CO_{name\ 130.1}\}$." Self-certifying name 128.1 comprises both the name 130.1 and digest 132.1 components as described in relation to FIGS. 5A and 5B.

Figure 5E:
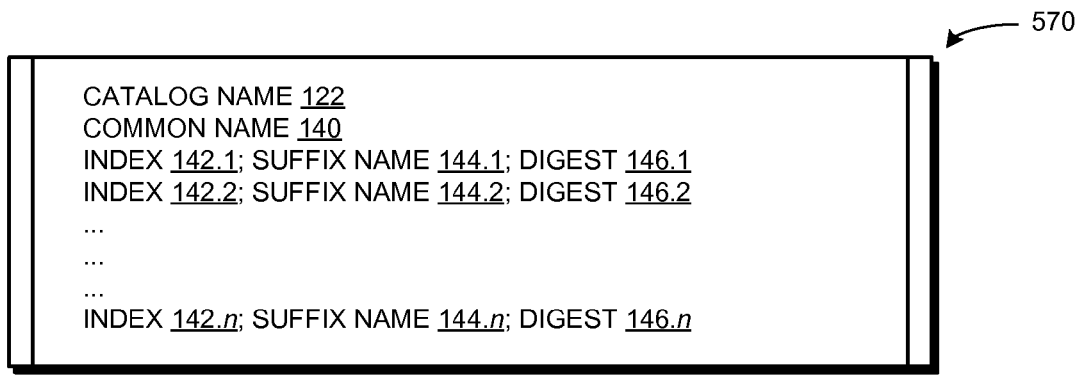
FIG. 5E presents a table depicting a format of a secure content catalog, where the catalog contains a common name element and a list of suffix name elements and corresponding digests, in accordance with an embodiment of the present invention.
Figure 5F:
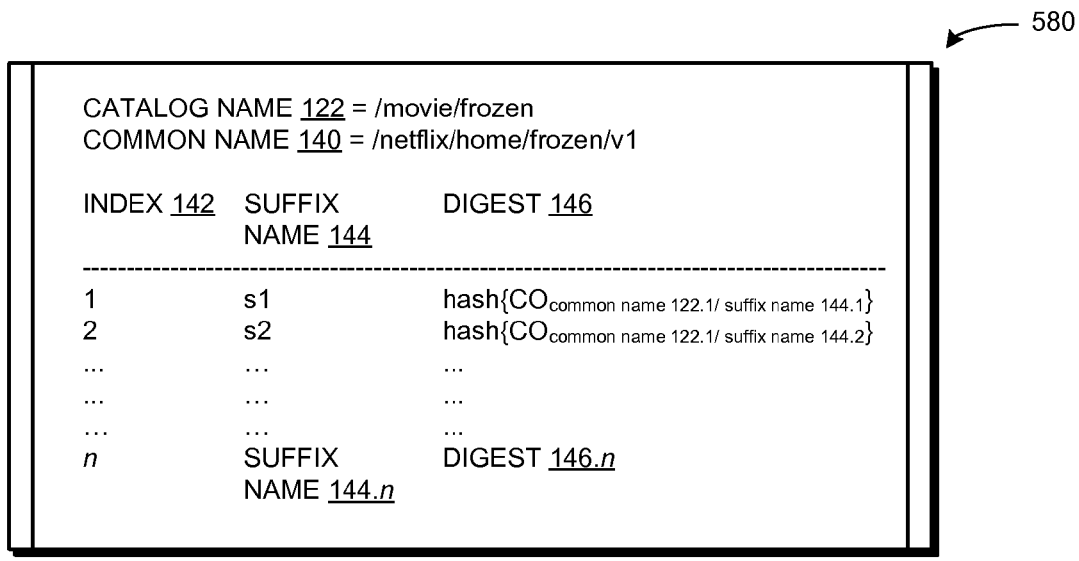
FIG. 5F presents an exemplary secure content catalog structure which contains a common name element and a list of suffix name elements and corresponding digests, in accordance with an embodiment of the present invention.

FIG. 5E presents a table depicting a format of a secure content catalog 570, where the catalog contains a common name element and a list of suffix name elements and corresponding digests, in accordance with an embodiment of the present invention. Secure content catalog 570 can contain a catalog name field 122 and a common name field 140, wherein the content objects associated with secure content catalog 570 are identified by an index 142.1-142.$n$, a suffix name field 144.1-144.$n$, and a corresponding digest 146.1-146.$n$ for the named content object, wherein the digest is a hash of the named content object. The system uses common name field 140 and suffix name field 144.1-144.*n* to determine the name of the content object. In this manner, the secure content catalog does not need to repeat the common elements of the name for each entry representing a member content object in the catalog. An example of this structure is shown in FIG. 5F, which depicts the content of a secure content catalog 580, which contains a catalog name 122 of "/movie/frozen" and a common name 140 of "/netflix/home/frozen/v1". The content object indicated by index 142.1 has an index value of 1, a suffix name 144.1 of "s1", and a corresponding digest 146.1 whose value is equal to the hash of the content object identified by the name "/netflix/home/frozen/v1/s1" (comprised of the common name 140.1 followed by the suffix name 144.1), "hash $\{CO_{common\ name\ 122/suffix\ name\ 144.1}\}$.

FIGS. 5A-F depict secure content catalogs which indicate a collection of content objects that are identified by their name and corresponding digests. A secure content catalog can consist of references to content objects containing data, public keys, or other catalogs. In some variations, the structure of a secure content catalog can be specific to an application. The structure of a secure content catalog can also vary from a single list of digests or self-certifying names to multiple lists in different content objects that form a variant of a Merkle tree.

Apparatus and Computer System

Figure 6:
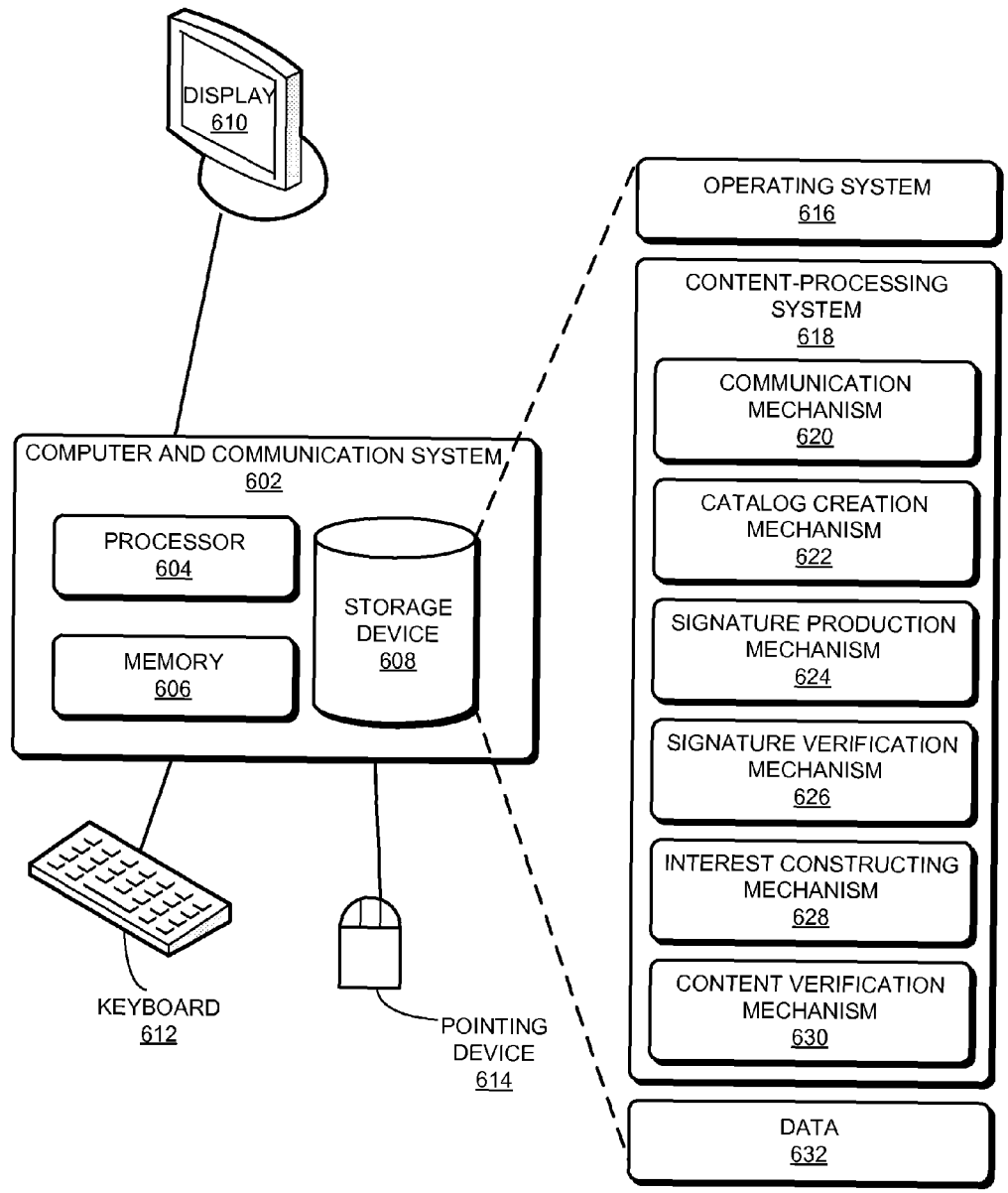
FIG. 6 illustrates an exemplary computer and communication system that facilitates efficient and secure distribution of digital content in a network by signing and verifying aggregates of content objects, in accordance with an embodiment of the present invention.

FIG. 6 illustrates an exemplary computer and communication system 602 that facilitates the secure and efficient distribution of digital content using a secure content catalog, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a content-processing system 618, and data 632.

Content-processing system 618 can include instructions, which when executed by computer and communication system 602, can cause computer and communication system 602 to perform methods and/or processes described in this disclosure. Specifically, content-processing system 618 may include instructions for sending requests for and receiving secure content catalogs and specific content objects identified by the secure content catalogs (communication mechanism 620). Furthermore, content-processing system 618 can include instructions for creating a secure content catalog that indicates a set of content objects and their corresponding digests (catalog creation mechanism 622). Content-processing system 618 can also include instructions for producing a digital signature for a secure content catalog based on a private key of the producer of the catalog (signature production mechanism 624). Content-processing system 618 can include instructions for verifying a digital signature for a secure content catalog based on a public key of the producer of the catalog (signature verification mechanism 626).

Content-processing system 618 can further include instructions for constructing an interest for a content object, where the interest indicates a name for the content object and the corresponding digest for the content object based on a secure content catalog, and where the name for the content object is a hierarchically structured variable length identifier (HSVLI) which comprises contiguous name components ordered from a most general level to a most specific level (interest constructing mechanism 628).

Content-processing system 618 can also include instructions for verifying received content by comparing a hash of the received content object with the corresponding digest in either a previously constructed interest or a previously cached entry (content verification mechanism 630).

Data 632 can include any data that is required as input or that is generated as output by the methods and/or processes described in this disclosure. Specifically, data 632 can store at least: a secure content catalog that indicates a set of content objects and their corresponding digests; a private key of a producer; a public key of a producer; a plurality of content objects, wherein the name for a content object is a hierarchically structured variable length identifier (HSVLI) which comprises contiguous name components ordered from a most general level to a most specific level; the index of a content object associated with the secure content catalog; the name of a content object associated with the secure content catalog; the corresponding digest of a content object associated with the secure content catalog, where the digest comprises a cryptographic hash of the named content object; and the self-certifying name of a content object associated with the secure content catalog, wherein a last name component of the HSVLI of the content object indicates the digest corresponding to the content object.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
receiving, by a client computing device, a secure content catalog that indicates a set of content objects and their corresponding digests, wherein the catalog is digitally signed with a private key of a content producing device of the catalog;

verifying the content producing device of the catalog based on a public key of the content producing device;

constructing an interest for a first content object based on the catalog, wherein the interest includes a hierarchically structured variable length identifier which comprises contiguous name components ordered from a most general level to a most specific level and the corresponding digest for the first content object; and in response to receiving the first content object, verifying the first content object by comparing a hash of the first content object with the corresponding digest included in the first content object, wherein the first content object is transmitted by the content producing device, wherein verifying the first content object involves using, by the client computing device and an intermediate router, the hash comparison in place of verifying a signature of the content producing device of the first content object, and wherein verifying the first content object causes the content producing device to avoid signing the first content object, and further causes the client computing device and the intermediate router to avoid verifying a signature of the content producing device of the first content object, facilitating efficient verification of content objects indicated in the signed catalog.

2. The method of claim 1, further comprising:
verifying the signature based on a public key of the content producing device of the catalog.

3. The method of claim 1, further comprising:
receiving the first content object;
wherein verifying the first content object causes the transmittal, from the content producing device to the client computing device and the intermediate router, of the first content object.

4. The method of claim 1, wherein a last component of the hierarchically structured variable length identifier of the first content object includes the digest of the constructed interest.

5. The method of claim 1, wherein a digest for one of the content objects indicated in the catalog is a cryptographic hash of the respective content object.

6. The method of claim 1, further comprising:
receiving, by the client computing device, a second content object that identifies the catalog based on a name for the catalog and indicates an index number that corresponds to one of the content objects indicated in the catalog; and
constructing an interest for the catalog, wherein the interest indicates the name for the catalog, and wherein the name for the catalog is a hierarchically structured variable length identifier which comprises contiguous name components ordered from a most general level to a most specific level.

7. The method of claim 6, further comprising:
verifying the signature in the catalog based on a public key of the content producing device of the catalog;
wherein verifying the first content object further involves comparing a hash of the first content object with the digest for the content object corresponding to the index number in the catalog.

8. A computer-implemented method comprising:
creating, by a content producing device, a secure content catalog that indicates a set of content objects and their corresponding digests, wherein a name for the content objects indicated in the catalog is a hierarchically structured variable length identifier which comprises contiguous name components ordered from a most general level to a most specific level;

producing a digital signature for the catalog based on a private key of a content producing device of the catalog;

in response to receiving from a client computing device a first interest for the catalog, wherein the first interest includes a hierarchically structured variable length identifier which comprises contiguous name components ordered from a most general level to a most specific level, transmitting to the client computing device a first content object corresponding to the digitally signed catalog; and in response to receiving from the client computing device a second interest for one of the content objects indicated in the catalog, wherein the second interest includes the name for the requested content object, transmitting a second content object based on the name for the requested content object, wherein transmitting the second content object facilitates the client computing device and the intermediate router to verify the second content object by comparing a hash of the content object with the corresponding digest included in the second content object, wherein the hash comparison is used in place of verifying a signature of the content producing device of the second content object, and wherein transmitting the second content object causes the content producing device to avoid signing the second content object, and further causes the client computing device and the intermediate router to avoid verifying a signature of the content producing device of the second content object, facilitating efficient verification of content objects indicated in the secure content catalog.

9. The method of claim 8, wherein a last component of the hierarchically structured variable length identifier of one of the content objects indicated in the catalog includes the digest of the respective content object.

10. The method of claim 8, wherein a digest for one of the content objects indicated in the catalog is a cryptographic hash of the respective content object.

11. The method of claim 8, further comprising:
transmitting, prior to creating the catalog, a third content object that identifies the catalog based on a name for the catalog and indicates an index number that corresponds to one of the content objects indicated in the catalog.

12. A computer system for secure and efficient distribution of digital content, the system comprising:
a processor;
a storage device coupled to the processor and storing instructions that when executed by a computer cause the computer to perform a method, the method comprising:
receiving, by a client computing device, a secure content catalog that indicates a set of content objects and their corresponding digests, wherein the catalog is digitally signed with a private key of a content producing device of the catalog;
verifying the content producing device of the catalog based on a public key of the content producing device;
constructing an interest for a first content object based on the catalog, wherein the interest includes a hierarchically structured variable length identifier which comprises contiguous name components ordered from a most general level to a most specific level and the corresponding digest for the first content object; and in response to receiving the first content object, verifying the first content object by comparing a hash of the first content object with the corresponding digest included in the first content object,
  wherein the first content object is transmitted by the content producing device,
  wherein verifying the content object involves using, by the client computing device and an intermediate router, the hash comparison in place of verifying a signature of the content producing device of the first content object, and
  wherein verifying the first content object causes the content producing device to avoid signing the first content object, and further causes the client computing device and the intermediate router to avoid verifying a signature of the content production device of the first content object,
  facilitating efficient verification of content objects indicated in the signed catalog.

13. The computer system of claim 12, wherein the method further comprises:
  verifying the signature based on a public key of the content producing device of the catalog.

14. The computer system of claim 12, wherein the method further comprises:
  receiving the first content object;
  wherein verifying the first content object causes the transmittal, from the content producing device to the client computing device and the intermediate router, of the first content object.

15. The computer system of claim 12, wherein a last component of the hierarchically structured variable length identifier of the first content object includes the digest of the constructed interest.

16. The computer system of claim 12, wherein a digest for one of the content objects indicated in the catalog is a cryptographic hash of the respective content object.

17. The computer system of claim 12, wherein the method further comprises:
  receiving, by the client computing device, a second content object that identifies the catalog based on a name for the catalog and indicates an index number that corresponds to one of the content objects indicated in the catalog; and
  constructing an interest for the catalog, wherein the interest indicates the name for the catalog, and wherein the name for the catalog is a hierarchically structured variable length identifier which comprises contiguous name components ordered from a most general level to a most specific level.

18. The computer system of claim 17, wherein the method further comprises:
  verifying the signature in the catalog based on a public key of the content producing device of the catalog;
  wherein verifying the first content object further involves comparing a hash of the first content object with the digest for the content object corresponding to the index number in the catalog.

19. A computer system for secure and efficient distribution of digital content, the system comprising:
  a processor;
  a storage device coupled to the processor and storing instructions that when executed by a computer cause the computer to perform a method, the method comprising:
    creating, by a content producing device, a secure content catalog that indicates a set of content objects and their corresponding digests, wherein a name for the content objects indicated in the catalog is a hierarchically structured variable length identifier which comprises contiguous name components ordered from a most general level to a most specific level;
    producing a digital signature for the catalog based on a private key of a content producing device of the catalog;
    in response to receiving from a client computing device a first interest for the catalog, wherein the first interest includes a hierarchically structured variable length identifier which comprises contiguous name components ordered from a most general level to a most specific level, transmitting to the client computing device a first content object corresponding to the digitally signed catalog; and
    in response to receiving from the client computing device a second interest for one of the content objects indicated in the catalog, wherein the second interest includes the name for the requested content object, transmitting a second content object based on the name for the requested content object,
    wherein transmitting the second content object facilitates the client computing device and the intermediate router to verify the second content object by comparing a hash of the second content object with the corresponding digest included in the second content object, wherein the hash comparison is used in place of verifying a signature of the content producing device of the second content object, and
    wherein transmitting the second content object causes the content producing device to avoid signing the second content object, and further causes the client computing device and the intermediate router to avoid verifying signature of the content producing device of the second content object,
    facilitating efficient verification of content objects indicated in the secure content catalog.

20. The computer system of claim 19, wherein a last component of the hierarchically structured variable length identifier of one of the content objects indicated in the catalog includes the digest of the content object.

21. The computer system of claim 19, wherein a digest for one of the content objects indicated in the catalog is a cryptographic hash of the respective content object.

22. The computer system of claim 19, wherein the method further comprises:
  transmitting, prior to creating the catalog, a third content object that identifies the catalog based on a name for the catalog and indicates an index number that corresponds to one of the content objects indicated in the catalog.

* * * * *